US012258099B2

(12) United States Patent
Spatola

(10) Patent No.: US 12,258,099 B2
(45) Date of Patent: Mar. 25, 2025

(54) ANCHOR STOWAGE SAFETY SYSTEM

(71) Applicant: Joseph Raffaele Spatola, Middletown, CT (US)

(72) Inventor: Joseph Raffaele Spatola, Middletown, CT (US)

( * ) Notice: Subject to any disclaimer, the term of this patent is extended or adjusted under 35 U.S.C. 154(b) by 422 days.

(21) Appl. No.: 17/862,775

(22) Filed: Jul. 12, 2022

(65) Prior Publication Data

US 2023/0012717 A1 Jan. 19, 2023

Related U.S. Application Data

(60) Provisional application No. 63/203,239, filed on Jul. 14, 2021.

(51) Int. Cl.
*B63B 21/22* (2006.01)
*B63B 21/04* (2006.01)
*B63B 21/20* (2006.01)
*G08B 21/24* (2006.01)

(52) U.S. Cl.
CPC .............. *B63B 21/22* (2013.01); *B63B 21/04* (2013.01); *B63B 21/20* (2013.01); *G08B 21/24* (2013.01); *B63B 2021/203* (2013.01)

(58) Field of Classification Search
CPC ......... B63B 21/22; B63B 21/04; B63B 21/20; B63B 2021/203; B63B 21/00–663; B63B 2021/001–666; G08B 21/24; G08B 21/02; G08B 21/18
See application file for complete search history.

(56) References Cited

U.S. PATENT DOCUMENTS 3,690,285 A * 9/1972 Ellison .................... B63B 21/22 114/294
4,570,348 A * 2/1986 Amsler .................. G01B 7/046 33/734
4,912,464 A * 3/1990 Bachman ................ B63B 21/22 367/141
5,932,815 A * 8/1999 Dodds ..................... G01L 5/107 340/531
2003/0128138 A1* 7/2003 Grunder .................. B63B 21/00 340/539.1
2015/0116496 A1* 4/2015 Ottaviano ............. B63B 21/227 348/148
2019/0217924 A1* 7/2019 Frizlen .................... G06T 7/246
2021/0316827 A1* 10/2021 Sirkin .................. G01B 11/043
2022/0242533 A1* 8/2022 Tolley ..................... B63B 21/00
2023/0391427 A1* 12/2023 Seltzer .................... B63B 21/24

* cited by examiner

*Primary Examiner* — Ryan W Sherwin
(74) *Attorney, Agent, or Firm* — Mathew J Patterson

(57) ABSTRACT

In some implementations, the anchor stowage safety system may include a contactless switch having a first contact half configured to be disposed on a portion of an anchor rode and a second contact half configured to be mounted to a stationary portion of a boat at a predetermined position. In addition, the anchor stowage safety system may include where the contactless switch is configured to be in a closed position when the first contact half and the second contact half are positioned adjacent to one another and is configured to be in an open position when the first contact half and the second contact half are positioned separated from one another.

20 Claims, 5 Drawing Sheets

ANCHOR STOWAGE SAFETY SYSTEM

BACKGROUND OF THE INVENTION

Field of the Invention

The present disclosure relates to an apparatus and system to improve the safety of boating.

Description of the Related Art

The prior art is replete with systems and methods to determine the length of anchor rode deployed or systems that track and report anchor drift. The prior art systems that determine the length of anchor rode deployed may have a zero reading, but they lack the capability to verify that the anchor is safely stowed. None of the prior art systems gives a user a visual or audible warning/indicator that the anchor is safely stowed or if the anchor is deployed.

What is needed is a system that gives a user a status of whether an anchor is safely stowed or is at least partially deployed.

SUMMARY OF THE INVENTION

In one general aspect, anchor stowage safety system may include a contactless switch having a first contact half configured to be disposed on a portion of an anchor rode a second contact half configured to be mounted to a stationary portion of a boat at a predetermined position. An anchor stowage safety system may also include where the contactless switch is configured to be in a closed position when the first contact half and the second contact half are positioned adjacent to one another and is configured to be in an open position when the first contact half and the second contact half are positioned separated from one another. Other embodiments of this aspect include corresponding computer systems, apparatus, and computer programs recorded on one or more computer storage devices, each configured to perform the actions of the methods.

Implementations may include one or more of the following features. The anchor stowage safety system may include an indicator configured to communicate with the contactless switch and where the indicator is configured to provide an indication of the closed position and the open position. The anchor stowage safety system where the closed position may include a stowed position of an anchor and the open position may include a deployed condition of the anchor. The anchor stowage safety system where the indicator may include a light and where the light is configured to produce a first color in the stowed position and is configured to produce a second color in the deployed condition. The anchor stowage safety system where the indicator may include an annunciator configured produce an audible indication of the deployed condition. The anchor stowage safety system where the second contact half is configured to be electrically connected to an ignition switch of an engine and where the second contact half is configured to receive electrical power when the ignition switch is in a start position or in a run position. The anchor stowage safety system where the indicator can may include any of a smartphone, a handheld device, a remote controller, an instrument panel and a bridge control panel. The anchor stowage safety system where the stationary portion of the boat may include any of an anchor well, a bow roller and a windlass. The anchor stowage safety system where the predetermined position is selected to position the first contact half and the second contact half adjacent to one another when the anchor is in a stowed position. The anchor stowage safety system where the anchor rode may include any of an anchor, a shackle, an eyelet, a rope, a cable and a chain.

In one general aspect, a method of ensuring safe anchor stowage may include providing a contactless switch and positioning a first contact half on a portion of an anchor rode and positioning a second contact half on a stationary portion of a boat at a predetermined position. The method may also include positioning the contactless switch in a closed position when the first contact half and the second contact half are positioned adjacent. The method may furthermore include positioning the contactless switch in an open position when the first contact half and the second contact half are positioned separated from one another. Other embodiments of this aspect include corresponding computer systems, apparatus, and computer programs recorded on one or more computer storage devices, each configured to perform the actions of the methods.

Implementations may include one or more of the following features. The method may include electrically coupling an indicator with the contactless switch and providing an indication of the closed position and the open position. The method where the closed position may include a stowed position of an anchor and the open position may include a deployed condition of the anchor. The method where the indicator may include a light, the method may include producing a first color light in the stowed position and producing a second color light in the deployed condition. The method where the indicator may include an annunciator producing an audible indication of the deployed condition. The method may include electrically coupling the second contact half to an ignition switch of an engine and powering the second contact half when the ignition switch is in a start position or in a run position. The method where the indicator can may include any of a smartphone, a handheld device, a remote controller, an instrument panel and a bridge control panel. The method where the stationary portion of the boat may include any of an anchor well, a bow roller and a windlass. The method may include stowing the anchor and positioning the second contact half adjacent to the first contact half at the predetermined position. The method where the anchor rode may include any of an anchor, a shackle, an eyelet, a rope, a cable and a chain. Implementations of the described techniques may include hardware, a method or process, or a computer tangible medium.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

Figure 1:
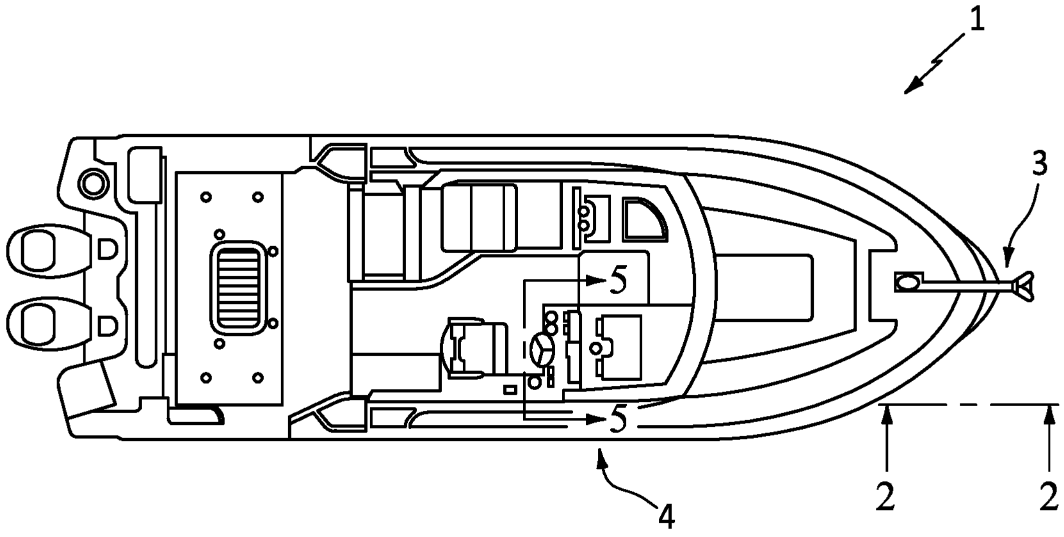
FIG. 1 is a top view of a boat including an anchor stowage safety system in accordance the present disclosure.
Figure 2:
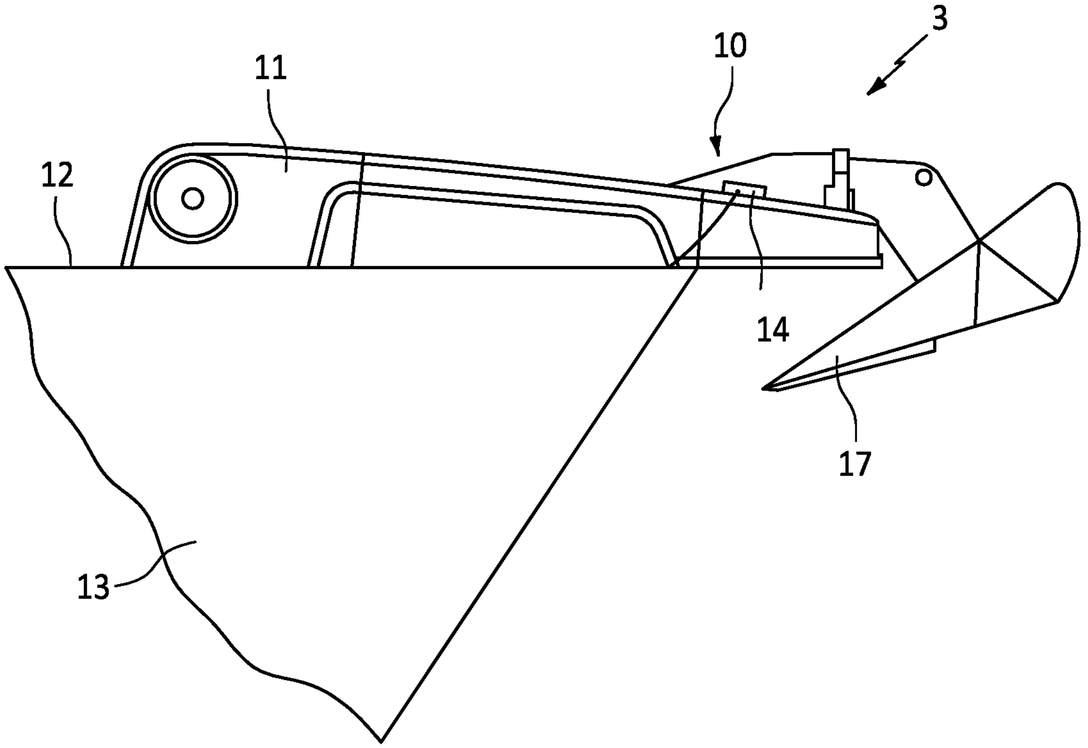
FIG. 2 is a section view of an anchor stowage safety system taken substantially along section line 2-2 of FIG. 1 in accordance the present disclosure.
Figure 3:
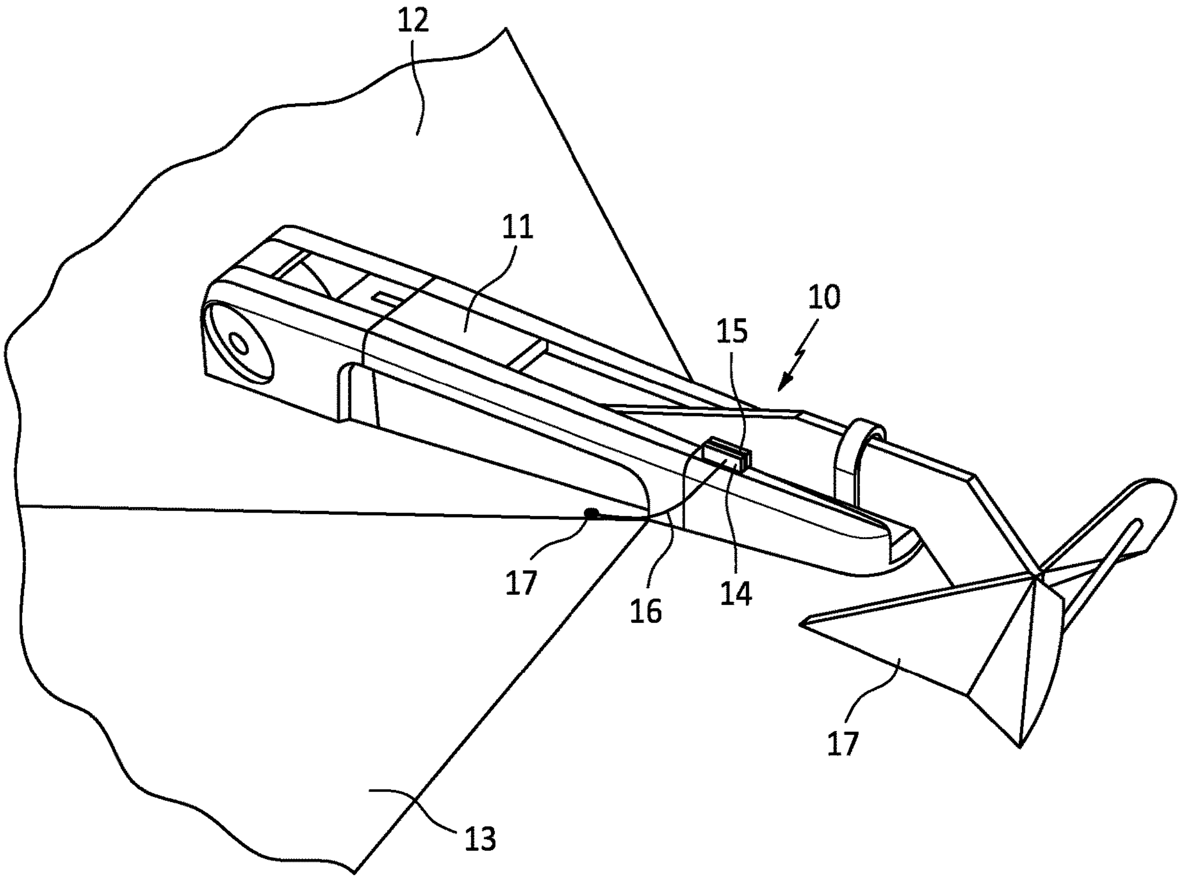
FIG. 3 is a perspective view of an anchor stowage safety system of FIG. 2 in accordance the present disclosure.
Figure 4:
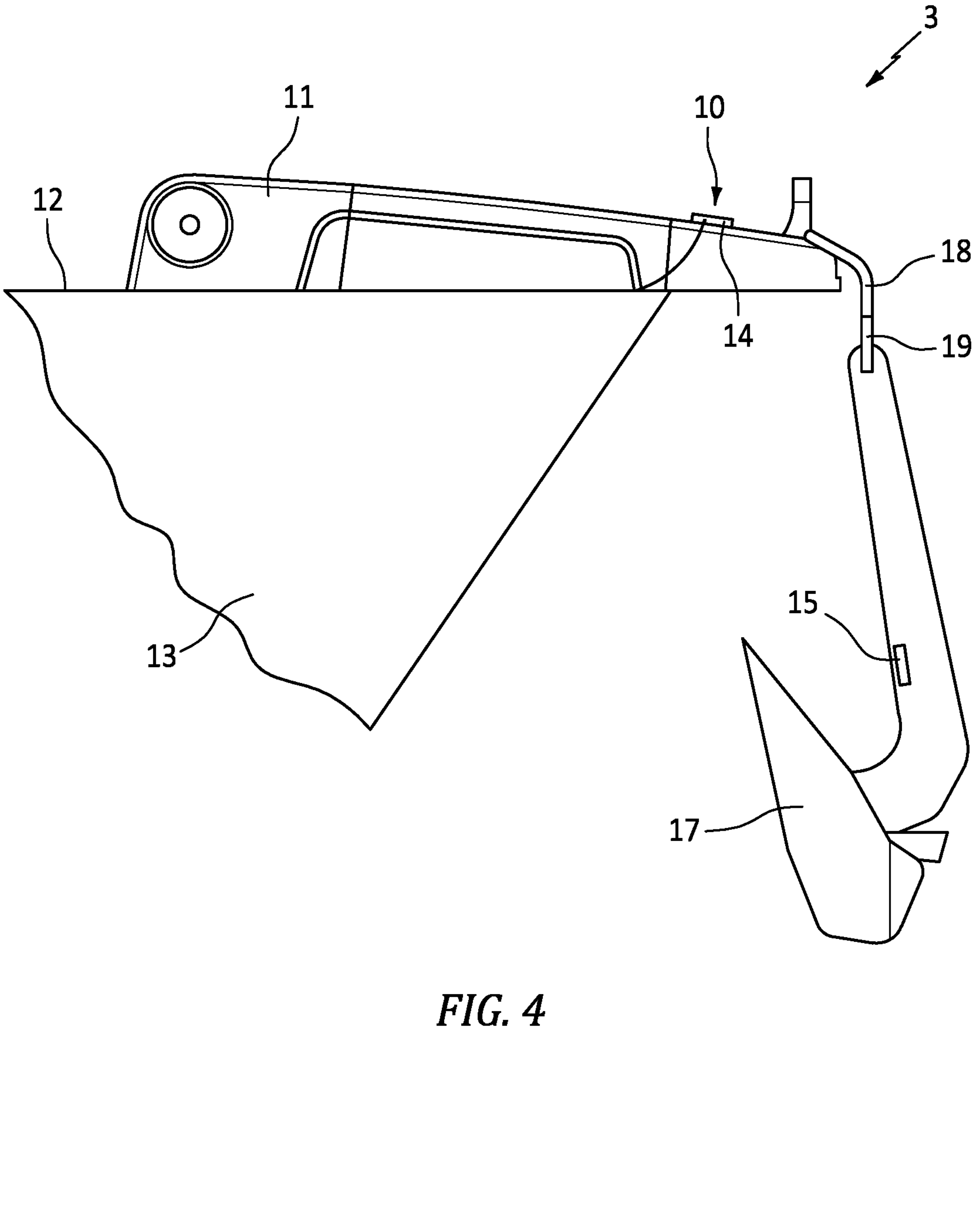
FIG. 4 is a section view of an anchor stowage safety system taken substantially along section line 2-2 of FIG. 1.

Referring to FIG. 1 there is shown, by example, a boat 1 that includes an anchor stowage safety system 3, anchor stowage device 3 and cockpit 4. Referring now to FIGS. 2, 3 and 4 there is shown an embodiment of anchor stowage device 3 of an anchor safety system in accordance with the current disclosure. The embodiment shown is but an example of an anchor stowage safety system in use as part of a windlass 11 mounted to the deck 12 of the bow 13 of boat 1. In this particular embodiment, sensor assembly 10 comprises a contactless switch comprised a first contact half and a second contact half comprised of a wired half 14 and magnetic contact 15. An example of a contactless switch is the Edwards Signaling Non-Contact Magnetic Switches or other suitable industrial electronics switch. It should be appreciated by those skilled in the art that sensor assembly 10 advantageously is sealed from the outside environment and does not have to make physical contact to close the circuit. Such advantages are highly regarded in the marine environment. Wired half 14 is mounted to a stationary portion of windlass 11 with suitable mounting techniques including fasteners, glues and other techniques. Wired half 14 includes wire 16 which can run a grommet 16 and through deck 12 and is used as part of the warning system as will be disclosed in more detail hereinafter. Magnetic contact 15 is mounted to a portion of anchor 17 with suitable mounting techniques including fasteners, glues and other techniques. Anchor 17 is shown in the stowed position within windlass 11. While anchor 17 is in the stowed position, wired half 14 and magnetic contact 15 of sensor assembly 10 are aligned such that the switch in the wired half is in a closed position making a complete circuit as will be disclosed in more detail hereinafter. Although shown mounted to windlass 11, wired half 14 can be mounted to any surface adjacent and proximate to magnetic contact 15 such as deck 12 and on the windlass below anchor 17. It should be appreciated that embodiments of the present disclosure include an adjustable mounting bracket (FIG. 6) to which wired half 14 can be mounted and which adjustable mounting bracket can advantageously be mounted to any appropriate surface such that the wired half can be positioned on a stationary portion in a predetermined position proximate magnetic contact 15 while anchor 17 is in the stowed position.

Although sensor assembly 10 is shown by way of example as a contactless switch comprised of a wired half 14 and magnetic contact 15 other sensor assemblies are contemplated by the current disclosure. For instance, sensor assembly 10 can comprise a proximity sensor configured to close a circuit when the anchor is safely stowed as described herein above. In addition, the sensor assembly can comprise a magnetic pickup that is positioned to sense a portion of anchor 17, clevis 19 or other ferrous containing metals and wherein the magnetic pickup is configured to close a circuit when the anchor is safely stowed as described herein above. In other embodiments of anchor stowage safety system 3, the sensor assembly can include a sensor, similar to wired half 14, capable of closing an electrical circuit when positioned proximate a magnet. In some such embodiments the magnet can be positioned on, or within, the rode 18 and wired half 14 is positioned within boat 1 configured to close a circuit when the magnet is positioned where the anchor is safely stowed.

Now with reference to FIG. 4, there is shown anchor storage device 3 and anchor 17 in a non-stowed or deployed position. Anchor 17 is secured to windlass 11 by rode 18 attached to the anchor by clevis 19 in a manner well known in the art. In the deployed condition wired half 14 and magnetic contact 15 are separated and the switch in the wired half is opened breaking the circuit as will be disclosed in more detail hereinafter. It should be appreciated by those skilled in the art that the circuit is open when anchor 17 is even slightly deployed, with the risk that it could be dislodged from the anchor storage device 3; with the anchor partially deployed as shown with the risk that damage could be done if the anchor collides with bow 13; and when the anchor is fully deployed, if the captain attempts to move boat 1 without stowing the anchor. In addition, deleterious effects can occur when an anchor is deployed and the user gets under way and can include catastrophic loss of engine drive components, hull breach, superstructure damage, vessel sinking, and personal injury and loss of life.

Figure 5:
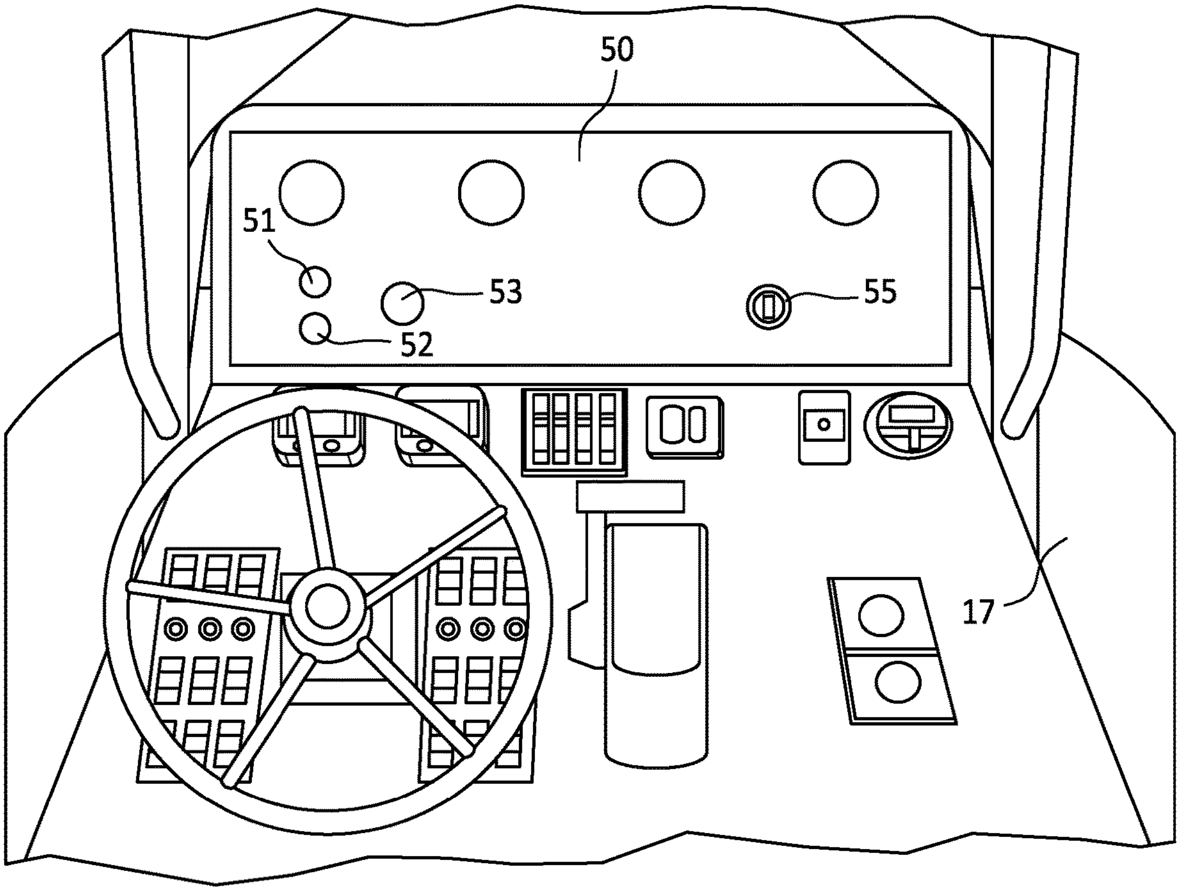
FIG. 5 is a section view of a warning panel of an anchor stowage safety system taken substantially along section line 5-5 of FIG. 1 in accordance the present disclosure.

With further reference to FIG. 5, there is shown cockpit 4 of boat 1 which includes many of the items commonly found in the prior art including instrument panel 50. Included in instrument panel 50 of cockpit 4 of this embodiment of anchor stowage safety system 3 are stowed warning light 51, deployed warning light 52 and annunciator 53. In certain embodiments of anchor stowage safety system 3 stowed warning light 51 is configured to produce a plurality of light colors and can be comprised of a green color light and is configured to be powered and lighted when wired half 14 and magnetic contact 15 of sensor assembly 10 are aligned, giving a user a visual indication that anchor 17 is properly stowed within anchor storage device 3. Deployed warning light 52 can be comprised of a red color light and is configured to be powered and lighted when wired half 14 and magnetic contact 15 of sensor assembly 10 are not aligned, giving a user a visual indication that anchor 17 is not properly stowed within anchor storage device 3 and can be partially or fully deployed. In embodiments wherein sensor assembly 10 is comprised of a low power device, the sensor assembly can be continuously powered by a battery and stowed warning light 51 and deployed warning light 52 can be variously enabled as a visual indicator of the status of anchor 17. In addition to deployed warning light 52, annunciator 53 is configured to configured to receive electrical power and when wired half 14 and magnetic contact 15 of sensor assembly 10 are not aligned (in an open position) and when the key 55 of an ignition switch is turned to the start or run position. Annunciator 53 can comprise a horn, such as a flush mount drop-in hidden horn, giving a user an audible indication that anchor 17 is not properly stowed within anchor storage device 3 and can be partially or fully deployed. Anchor stowage safety system 3 can include circuitry, such as a relay, that once the engine is started with anchor 17 properly stowed within anchor storage device 3 the anchor can be deployed without annunciator 53 sounding allowing a user to deploy the anchor without the horn going off. In other embodiments, anchor stowage safety system 3 can include circuitry, such as a timer, such that if the engine is running and anchor 17 is not properly stowed within anchor storage device 3 the anchor can be deployed without annunciator 53 sounding allowing a user to deploy the anchor without the horn constantly going off (such as when setting or retrieving the anchor). In addition, instrument panel 50 of cockpit 4 can include appropriate written indicia (not shown) positioned proximate stowed warning light 51, deployed warning light 52 and annunciator 53.

In operation, safe anchor stowage can be accomplished with anchor 17 properly stowed within anchor storage device 3 wherein a user can turn key 55 to the run position and get a visual indication of the stowed condition via stowed warning light 51. Once the requisite other checks are complete (bilge, CO detection, etc.), the user can turn key 55 to the start position and back to run position (usually automatic) to start the engine and in addition to getting the visual indication of the stowed condition via stowed warning light 51, the absence of an audible indication from annunciator 53 gives the user the assurance that anchor 17 is safely stowed and the boating journey can begin. Once the boat arrives at an anchorage spot the user can deploy anchor 17 and deployed warning light 52 will give a user a visual indication that the anchor has been deployed. In low power embodiment disclosed herein above, even after a user has turned key 55 to the off position deployed warning light 52 will continue to give a user a visual indication that the anchor has been deployed. When it is time for a user to move boat 1 to another location the user would approach cockpit 4 and deployed warning light 52 would give the user a visual indication that the anchor was still deployed. Depending on the situation, the user could retrieve and properly stow anchor 17 within anchor storage device 3 and confirm that the anchor is properly stowed through the visual indication of the lighting of stowed warning light 51. If, in a different situation, a user attempts to start the engine when anchor 17 is not properly stowed within anchor storage device 3 (partially or fully deployed) the horn of annunciator 53 will sound giving the user the audible indication of the deployed status of the anchor. The visual and audible indicators of the deployed status of anchor 17 give the user the ability to properly retrieve and stow the anchor within anchor storage device 3. As disclosed herein above the ability to properly retrieve and stow the anchor within anchor storage device 3 before getting under way can prevent injury to persons and property. In other implementations of anchor stowage safety system 3 annunciator 53 can be over-ridden, either manually or using circuit logic, in instances where the anchor 17 is deployed but the engine is on and the key is in the run position. Such instances include when an operator wants to run the engine(s) to charge a battery, needs to move the boat 1 to retrieve anchor 17 or other such circumstances.

Figure 6:
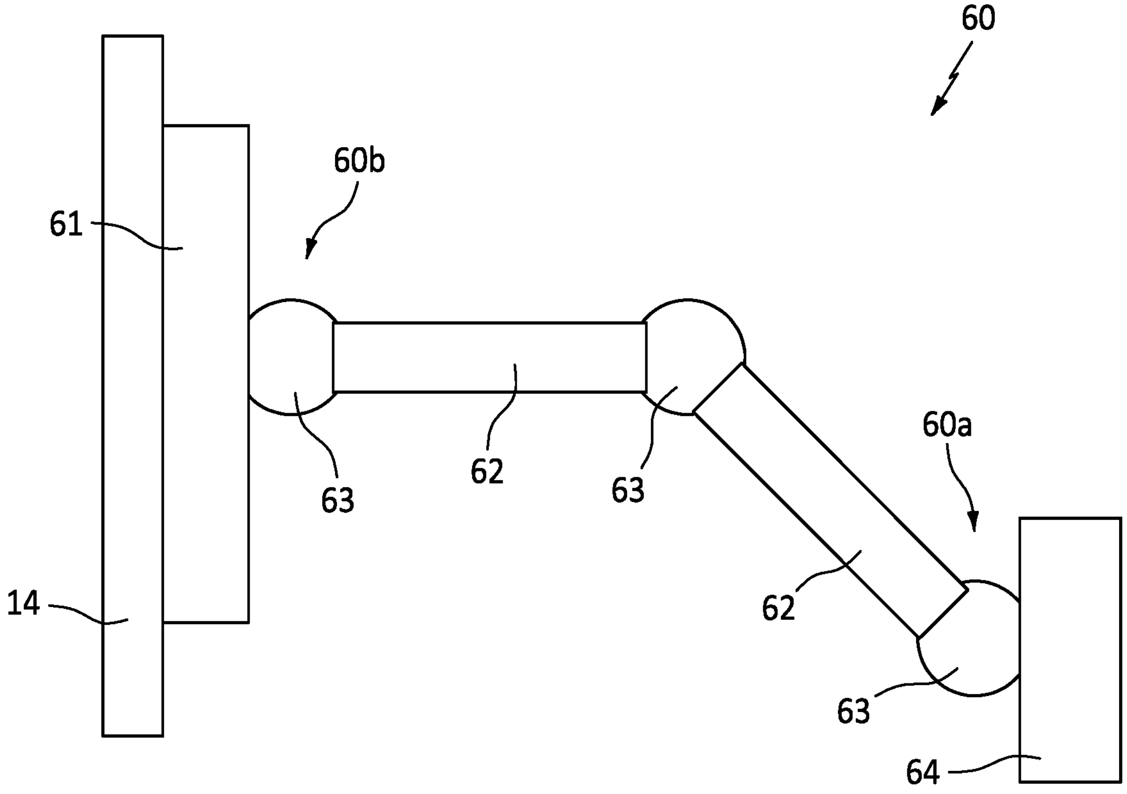
FIG. 6 is a side view of an adjustable mechanism in accordance the present disclosure.

Referring to FIG. 6, an adjustable mechanism 60 configured to adjustably position wired half 14 of sensor assembly to position it in proximity with magnetic contact 15. Adjustable mechanism 60 is adjustably coupled to a structure of the boat 1, such as deck 12 via base 64, via the adjustable mechanism and a holding device 61. A distal end 60*a* of the adjustable mechanism 60 is coupled to the boat 1 (e.g., deck 12, windlass 11, etc.) in any manner disclosed herein above. Proximal end 60*b* of the adjustable mechanism 60 is coupled to wired half 14 via one of the embodiments of the mounting the wired half disclosed herein above. The adjustable mechanism 60 includes one or more rigid, elongated members 62 (e.g., links; two as shown) that are movably coupled to each other, the boat 1, and/or the holding device 61 via joints 63 that are selectively lockable. One or both of the elongated members 62 may further be selectively adjustable and selectively lockable in length. The joints 63 generally provide one, two, or three rotational degrees of freedom between the members 62 coupled thereto. Collectively, the elongated members 62 and the joints 63 allow wired half 14 to be moved to several positions and in any desired angular orientation to be aligned with magnetic contact 15. The joints 63 are configured to allow movement upon user input or manipulation.

Anchor stowage safety system 3 can be retrofitted to existing boats 1 and anchors 17 or may come fitted as an original equipment manufacturer system. Anchor stowage safety system 3 can be used with many existing and yet to be developed anchor stowage systems such as anchor wells, bow rollers and windlasses. As part of the present disclosure, anchor stowage safety system 3 can be used with smaller boats where the anchor is manually thrown off and retrieved wherein sensor assembly 10 is positioned within the compartment where the anchor 17 is stowed. It should be appreciated by those skilled in the art that anchor stowage safety system 3 can be used with any type of anchor rode including various eyelets, ropes, cables, chain, shackles and hybrids. It is within the scope of the present disclosure that anchor stowage safety system 3 can include wireless capability to communicate the stowage status of anchor 17 to instrument panel 50, smartphones, handheld device, remote controllers for thrusters, bridge control panels and the like. It should be further appreciated that anchor stowage safety system 3 is not limited to a size or classification of vessel or a size, number or type of anchor. It should be appreciated by those skilled in the art that instrument panel 50 may include a system of one or more computers. The system of one or more computers can be configured to perform particular operations or actions disclosed herein above by virtue of having software, firmware, hardware, or a combination of them installed on the system that in operation causes or cause the system to perform the actions. One or more computer programs can be configured to perform particular operations or actions disclosed herein above by virtue of including instructions that, when executed by data processing apparatus, cause the apparatus to perform the actions.

While the foregoing is directed to embodiments of the present invention, other and further embodiments of the invention may be devised without departing from the basic scope thereof, and the scope thereof is determined by the claims that follow.

What is claimed is:

1. An anchor stowage safety system comprising:

an anchor stowage device mounted to a boat for securing an anchor therein; and a contactless switch comprising:

a first contact half disposed on a portion of an anchor rode; and a second contact half mounted to the anchor stowage device at a predetermined position;

wherein the contactless switch is in a closed position with the anchor in a safely stowed position within the anchor stowage device; and wherein the contactless switch is in an open position when the anchor is not in the safely stowed position within the anchor stowage device.

2. The anchor stowage safety system of claim 1 further comprising:

an indicator configured to communicate with the contactless switch; and wherein the indicator is configured to provide an indication of the closed position and the open position.

3. The anchor stowage safety system of claim 2 wherein the closed position comprises a stowed position of an anchor and the open position comprises a deployed condition of the anchor.

4. The anchor stowage safety system of claim 3 wherein the indicator comprises a light and wherein the light is configured to produce a first color in the stowed position and is configured to produce a second color in the deployed condition.

5. The anchor stowage safety system of claim 3 wherein the indicator comprises an annunciator configured to produce an audible indication of the deployed condition.

6. The anchor stowage safety system of claim 3 wherein the second contact half is configured to be electrically connected to an ignition switch of an engine and wherein the second contact half is configured to receive electrical power when the ignition switch is in a start position or in a run position.

7. The anchor stowage safety system of claim 3 wherein the indicator can comprise any of a smartphone, a handheld device, a remote controller, an instrument panel and a bridge control panel.

8. The anchor stowage safety system of claim 1 wherein the anchor stowage device comprises any of an anchor well, a bow roller and a windlass.

9. The anchor stowage safety system of claim 8 wherein the predetermined position is selected to position the first contact half and the second contact half adjacent to one another when the anchor is in a stowed position.

10. The anchor stowage safety system of claim 1 wherein the anchor rode comprises any of an anchor, a shackle, an eyelet, a rope, a cable and a chain.

11. A method of ensuring safe anchor stowage comprising:

providing a contactless switch comprising:

positioning a first contact half on a portion of an anchor rode attached to an anchor; and positioning a second contact half at a predetermined position on an anchor stowage device mounted to a boat;

positioning the contactless switch in a closed position when the anchor is safely stowed within the anchor stowage device; and positioning the contactless switch in an open position when the anchor is not safely stowed within the anchor stowage device.

12. The method of ensuring safe anchor stowage of claim 11 further comprising:

electrically coupling an indicator with the contactless switch; and providing an indication of the closed position and the open position.

13. The method of ensuring safe anchor stowage of claim 12 wherein the closed position comprises a stowed position of the anchor and the open position comprises a deployed condition of the anchor.

14. The method of ensuring safe anchor stowage of claim 13 wherein the indicator comprises a light, the method further comprising:

producing a first color light in the stowed position; and producing a second color light in the deployed condition.

15. The method of ensuring safe anchor stowage of claim 13 wherein the indicator comprises an annunciator, the method further comprising producing an audible indication of the deployed condition.

16. The method of ensuring safe anchor stowage of claim 13 further comprising electrically coupling the second contact half to an ignition switch of an engine and powering the second contact half when the ignition switch is in a start position or in a run position.

17. The method of ensuring safe anchor stowage of claim 13 wherein the indicator can comprise any of a smartphone, a handheld device, a remote controller, an instrument panel and a bridge control panel.

18. The method of ensuring safe anchor stowage of claim 11 wherein the anchor stowage device comprises any of an anchor well, a bow roller and a windlass.

19. The method of ensuring safe anchor stowage of claim 18 further comprising stowing the anchor and positioning the second contact half adjacent to the first contact half at the predetermined position.

20. The method of ensuring safe anchor stowage of claim 11 wherein the anchor rode comprises any of an anchor, a shackle, an eyelet, a rope, a cable and a chain.

* * * * *